(12) United States Patent
Franco

(10) Patent No.: US 10,872,136 B2
(45) Date of Patent: Dec. 22, 2020

(54) USING AN NP-COMPLETE PROBLEM TO DETER MALICIOUS CLIENTS

(71) Applicant: PAYPAL, INC., San Jose, CA (US)

(72) Inventor: John Franco, Seattle, WA (US)

(73) Assignee: PayPal, Inc., San Jose, CA (US)

( * ) Notice: Subject to any disclaimer, the term of this patent is extended or adjusted under 35 U.S.C. 154(b) by 264 days.

(21) Appl. No.: 15/857,172

(22) Filed: Dec. 28, 2017

(65) Prior Publication Data

US 2019/0205512 A1 Jul. 4, 2019

(51) Int. Cl.
| | |
|---|---|
| G06F 17/10 | (2006.01) |
| G06F 21/31 | (2013.01) |
| G06F 21/55 | (2013.01) |
| G06F 16/903 | (2019.01) |
| H04L 9/08 | (2006.01) |
| H04L 9/32 | (2006.01) |
| G06F 21/44 | (2013.01) |

(52) U.S. Cl.
CPC .......... *G06F 21/316* (2013.01); *G06F 16/903* (2019.01); *G06F 17/10* (2013.01); *G06F 21/44* (2013.01); *G06F 21/554* (2013.01); *H04L 9/088* (2013.01); *H04L 9/3271* (2013.01)

(58) Field of Classification Search
CPC ...... G06F 21/316; G06F 16/903; G06F 17/10; G06F 21/44; G06F 21/554; H04L 9/3271; H04L 9/088
See application file for complete search history.

(56) References Cited

U.S. PATENT DOCUMENTS

| | | | | |
|---|---|---|---|---|
| 9,202,038 | B1* | 12/2015 | Allen | G06F 21/40 |
| 9,905,315 | B1* | 2/2018 | Ghosh | G11C 5/06 |
| 2008/0175266 | A1* | 7/2008 | Alperovitch | G06F 21/554 370/465 |
| 2014/0189808 | A1* | 7/2014 | Mahaffey | H04L 63/083 726/4 |
| 2015/0128236 | A1* | 5/2015 | Moscicki | H04L 63/0876 726/7 |
| 2017/0289168 | A1* | 10/2017 | Bar | H04L 63/0853 |

OTHER PUBLICATIONS

Maike Massierer et al., Provably Secure Cryptographic Hash Functions, Dec. 2006, pp. 29 and 41 (Year: 2006).*

* cited by examiner

*Primary Examiner* — Shanto Abedin
*Assistant Examiner* — Kalu Kelly Emeaba
(74) *Attorney, Agent, or Firm* — Haynes and Boone, LLP

(57) ABSTRACT

Methods and systems for using a challenge-response problem to deter malicious clients are described. A login attempt from a computing device with an associated identity profile is detected. A reputation score is determined based on the identity profile, and a strength of a challenge-response problem for use with the login attempt is set based on the determined reputation score. The challenge-response problem with the set strength is then sent to the computing device. The login attempt is permitted to proceed when a solution to the challenge-response problem received from the computing device is verified.

20 Claims, 4 Drawing Sheets

USING AN NP-COMPLETE PROBLEM TO DETER MALICIOUS CLIENTS

TECHNICAL FIELD

The subject technology generally relates to detecting bad actors and more particularly, relates to a system and method that utilizes a nondeterministic polynomial time-complete (NP-complete) problem to deter malicious clients.

BACKGROUND

Over recent years, the volume of sensitive information transacted over the internet has increased drastically. Various measures continue to be taken to improve the security of these transactions. One technique that is widely used by hackers trying to compromise user accounts is credential stuffing, where stolen account credentials are used to access user accounts through large-scale automated login requests directed against web applications. For example, account credentials (e.g., username and password pairs) that have been stolen may be tried across different websites and applications associated with different organizations. The likelihood that any individual stolen credential is the actual username and password for an account of a particular organization is low; however, by trying a large collection of stolen credentials across accounts of many different organizations, potential username and password matches may be discovered. This credential stuffing technique is facilitated by modern computing power, where numerous usernames and passwords can be tried in a short amount of time.

While certain organizations are now requiring more robust passwords, such requirements aren't useful when stolen credentials are tried across a variety of different accounts. As such, alternative mechanisms for thwarting techniques such as credential stuffing are necessary to deter malicious clients.

SUMMARY

According to various aspects of the subject technology, a system for using a challenge-response problem to deter malicious clients is described. A login attempt from a computing device with an associated identity profile is detected. A reputation score is determined based on the identity profile, and a strength of a challenge-response problem for use with the login attempt is set based on the determined reputation score. The challenge-response problem with the set strength is then sent to the computing device. The login attempt is permitted to proceed when a solution to the challenge-response problem received from the computing device is verified.

According to various aspects of the subject technology, a method for using a challenge-response problem to deter malicious clients is described. A login attempt from a computing device is detected. If an identity profile for the computing device does not exist, a challenged-response problem is set at a predetermined strength and sent to the computing device. If the identity profile does exist, a reputation score is determined based on the identity profile, and a strength of a challenge-response problem for use with the login attempt is set based on the determined reputation score. The challenge-response problem with the set strength is then sent to the computing device. The login attempt is permitted to proceed when a solution to the challenge-response problem received from the computing device is verified. The login attempt is denied from proceeding when either a wrong solution to the challenge-response problem is provided, or a response is not provided within a predetermined period of time.

According to various aspects of the subject technology, a non-transitory machine-readable medium having stored thereon machine-readable instructions executable to use a challenge-response problem to deter malicious clients is described. A login attempt from a computing device with an associated identity profile is detected. A reputation score is determined based on the identity profile, and a strength of an NP-complete problem for use with the login attempt is set based on the determined reputation score. The NP-complete response problem with the set strength is then sent to the computing device. The login attempt is permitted to proceed when a solution to the NP-complete problem received from the computing device is verified.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
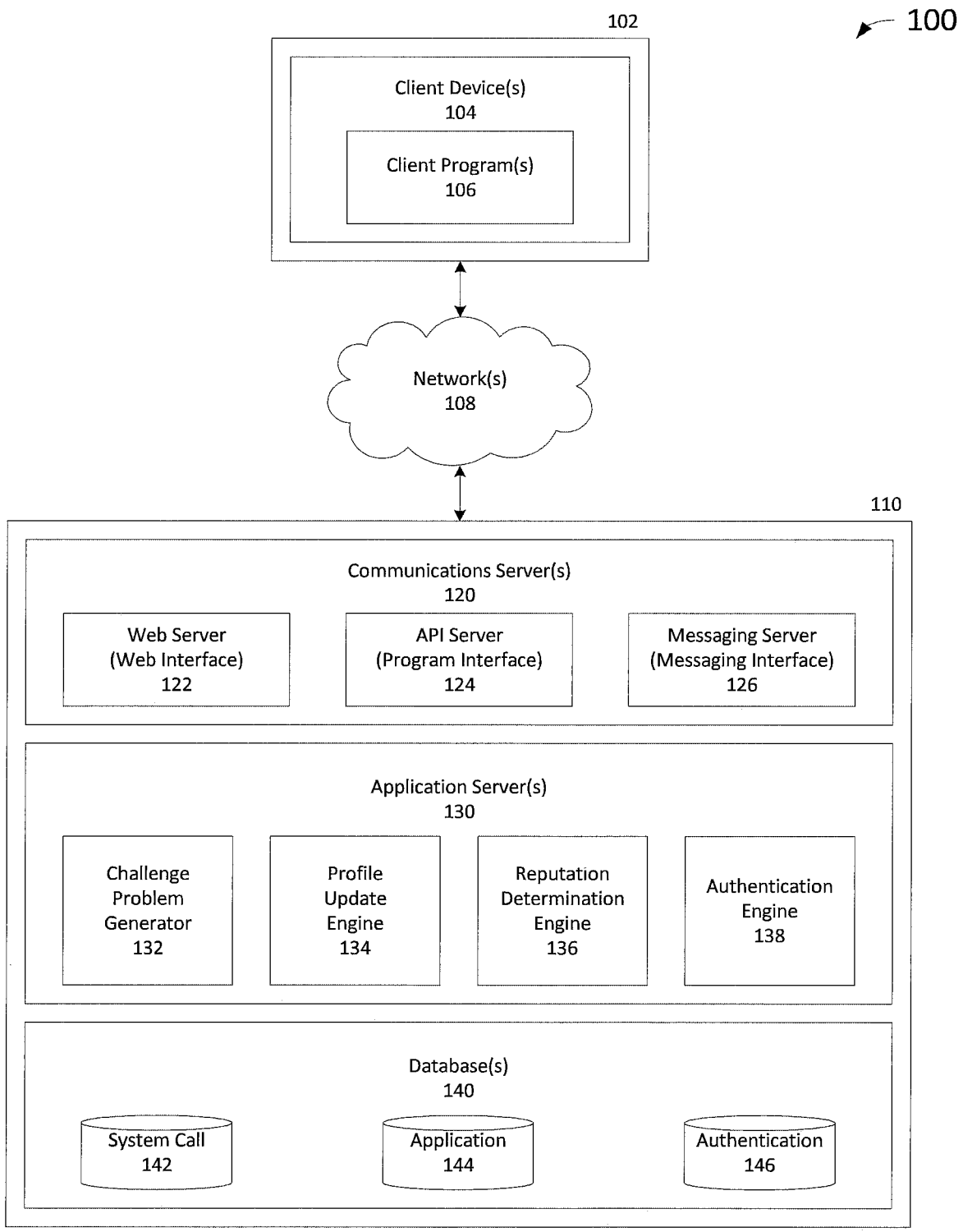
FIG. 1 is a block diagram of an exemplary computing system on which a determination of the legitimacy of clients using a challenge-response problem may be performed.

Personal electronic devices (e.g., smartphones, desktops, tablets, laptops, etc.) are used for a variety of purposes including but not limited to real-time communications, financial transactions, and the transmission of or sharing of data. For these activities to be properly conducted, a user must be authenticated to ensure that the user is who the user claims to be. Numerous applications are now available for users to connect to their accounts which contain sensitive information (e.g., personal information, financial information, etc.). As a result, these applications that serve as gateways to sensitive information become targets for unscrupulous activity.

One technique that is popular among hackers is credential stuffing, where hackers run programs (e.g., bot nets) that attempt large-scale login requests directed against web applications using stolen or even made-up credentials (e.g., username and password pairs). That is, bot nets may simulate authentication requests via mobile devices that run native applications of organizations. Hackers have also demonstrated the ability to decompile instances of the native application, obtain embedded secrets, and duplicate the use of those secrets to escape detection by previously-implemented efforts to distinguish attackers from legitimate clients. While tools such as reCaptcha have been used to prevent mass authentication requests, the use of tools like reCaptcha may cause friction in the login process and in turn may turn customers away. Additionally, advancements in computing power has only made it easier for hackers to try larger collections of credentials over a shorter period of time. Ultimately, through sheer brute force method, the greater the number of credentials that are tried, the more likely an individual's account will be infiltrated.

Accordingly, one way to inhibit high-volume attacks by bot nets that send high rates of customer authentication requests where a server cannot rely on the secrecy of keys or algorithms built into legitimate clients to distinguish between legitimate clients and bot nets is to raise a client's computational cost of sending an authentication request. Doing so would cause the potential hackers to have to spend more resources to maintain their current attack volumes. Such a mechanism will cause the hackers to either stop their attacks because they are no longer efficient or effective, or to switch to a different target that does not carry such a cost. A legitimate client, however, will not likely be discouraged to pay the computational cost since the success rate of the client's authentication request is high in comparison to requests made by bot nets. In other words, a legitimate client would only have to pay the cost once per login attempt (assuming the attempt is successful), whereas a bot net will pay the cost for each of the many attempts (an extremely high percentage which are unsuccessful).

In order for this approach to work, however, several criteria must be satisfied: 1) that the client paid the cost must be verifiable; 2) there is an easy way to vary the cost imposed on the client in accordance to changing circumstances, without requiring changes to the implementation of legitimate clients; 3) the cost to verify the client's payment is considerably less than the cost borne by the client in responding to the challenge; and 4) a fine-grained control over the cost imposed on the client is provided. Accordingly, an NP-complete problem that requires the client to solve it within a bounded period of time makes for a suitable protocol.

Using this protocol, a server may generate a random instance of NP-complete problem that is presented to the client. Furthermore, the server is able to control the cost by altering the number of terms in the NP-complete problem. Using subset-sum as an example NP-complete problem, increasing the number of terms (i.e., increasing the robustness of the problem) causes a linear increase in the server's cost to generate the problem and to verify the challenge, while causing an exponential increase in the client's cost to properly respond to the challenge. In other words, it would be much less costly for the server to verify that the challenge has been met than it would be to actually complete the challenge on the client side. Other NP-complete problems might, however, require super-linear time to generate an arbitrary instance known to have a solution.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(1) for that component.

FIG. 1 is a block diagram of an exemplary computing system on which a determination of the legitimacy of clients using a challenge-response problem may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services to client devices, such as tools for authenticating users and associated libraries. Application servers 130 may include multiple servers and/or components. For example, application servers 130 may include a challenge problem generator 132, profile update engine 134, reputation determination engine 136, and/or authentication engine 138. These servers and/or components, which may be in addition to other servers, may be structured and arranged to identify those webpages that malicious content.

Application servers 130, in turn, may be coupled to and capable of accessing one or more databases 140 including system call database 142, application database 144, and/or authentication database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
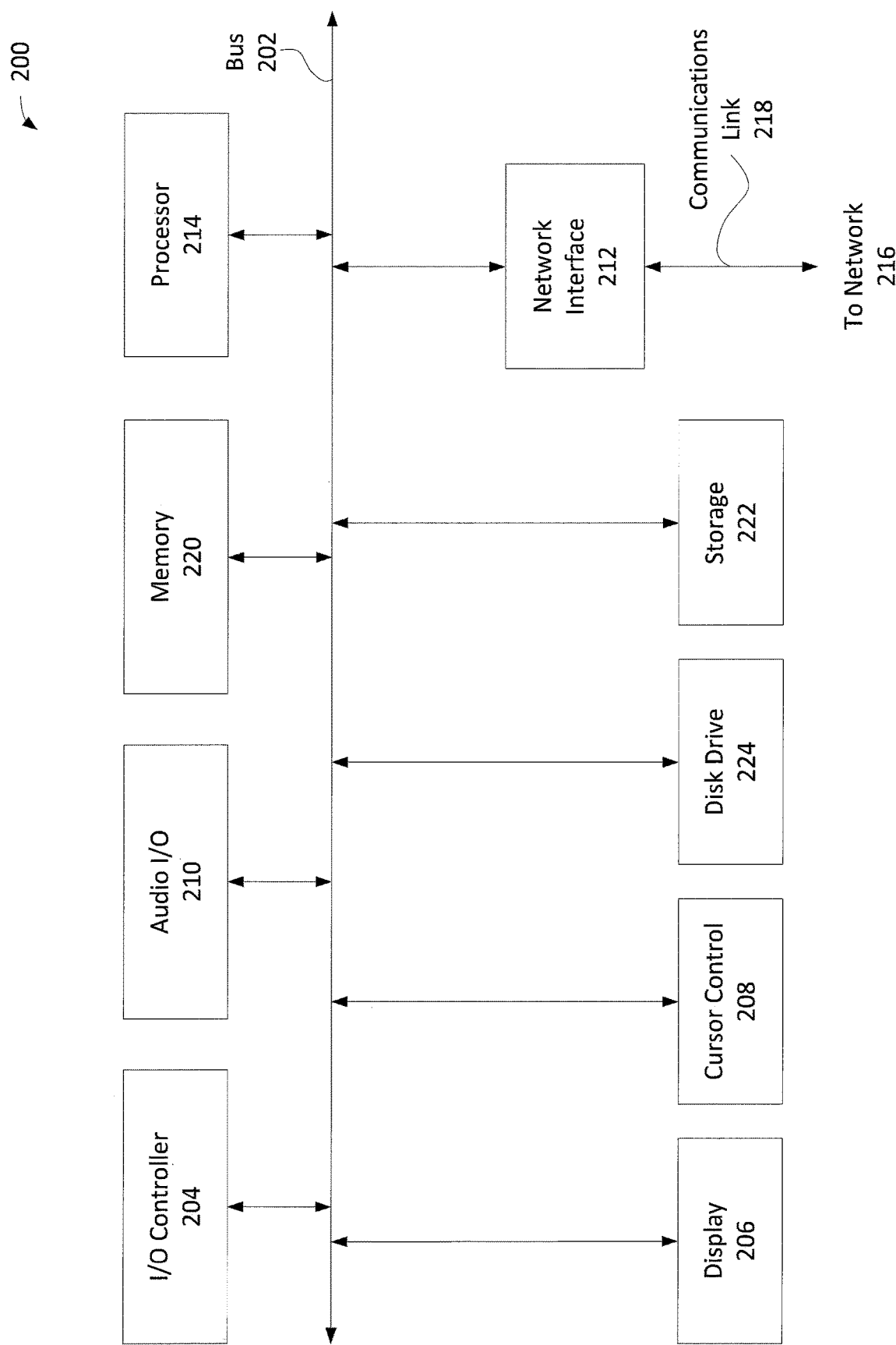
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
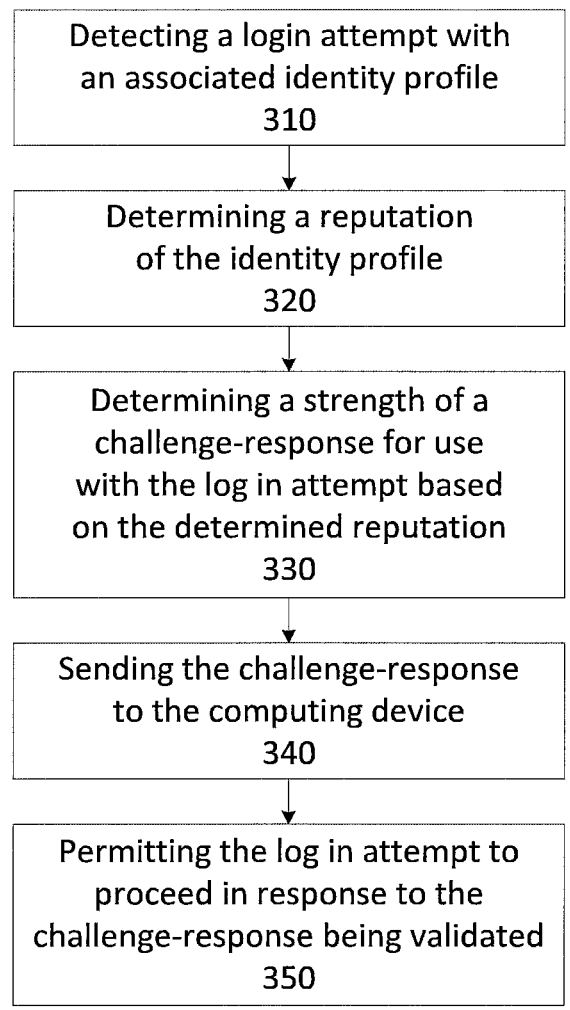
FIG. 3 illustrates an exemplary process 300 for using a challenge-response problem to determine the legitimacy of clients.

FIG. 3 illustrates an exemplary process 300 for using a challenge-response problem to determine the legitimacy of clients. At operation 310 the system detects a login attempt with an associated identity profile. A login attempt may be detected as a user navigating to a login screen with a browser, or the user initiating an app on a smartphone, tablet or other computing device, and providing login credentials such as a username and password. The login attempt may also be associated with an identity profile. For example, the system may build an identity profile specific to a computing device. That is, the identity profile may be associated with a unique identifier of the computing device.

In some embodiments, the identity profile is built based on historical data associated with the computing device. For example, the identity profile may include information such past logins into an application, and the type of transactions conducted once logged in. The identity profile may further include information such as the internet protocol (IP) address associated with the computing device. Additionally, the identity profile may keep track of the users that have logged into the application from the computing device, and a log of the login attempts, e.g., whether the user is able to log in successfully on the first attempt, or if the user needed multiple login attempts to be successful.

In operation 320, a reputation score for the computing device is determined based on the identity profile. For example, if the identity profile indicates that the computing device has been regularly used in the past to log into the application, the effect on the reputation would be positive because the computing device is presumably known to the application. Other factors such as the timing of the previous logins may also contribute to reputation. For instance, if the identity profile indicates that a computing device has not logged into the application for longer than a predetermined period of time, reputation of that identity profile may take a hit as the assumption is that the computing device may not be as familiar, and thus safe, as it once was. Furthermore, any indications within the identity profile that the computing device is departing from normal or expected use may adversely affect the reputation. In other words, different styles of uses of the computing device indicating different behaviors may contribute to determining the riskiness of the computing device, and thus contribute to the reputation.

Based on the reputation, a corresponding strength of a challenge-response for use with the login attempt may be set in step 330. In a preferred embodiment, the challenge-response may be an NP-complete problem. In some embodiments, the NP-complete problem is a subset sum problem. While the NP-complete problem is well known, the use of the NP-complete problem described herein is unusual or unconventional, and has not been contemplated as a mechanism for enhancing the security of an authentication process in the manner described below. The characteristics of the NP-complete problem makes it particularly useful because of the unique results that it produces.

In an NP-complete problem, the cost of solving the problem may be made disproportionally high when compared to the cost of generating and verifying the problem. In other words, the main characteristic of an NP-complete problem is that the problem is much more costly to solve than to generate and verify. While an increase in the number of terms (i.e., increasing the robustness of the problem) in an NP-complete problem causes a linear increase in the server's cost to generate and verify the challenge, the same increase causes an exponential increase in the client's cost to properly respond to the challenge. In other words, it would be much less costly for the server to generate the challenge and verify that the challenge has been met than it would be to actually complete the challenge on the client side.

A strength of challenge may be indicated by an integer. The time required to solve the problem increases very quickly as the size of the problem grows. As such, the strength of the challenge-response corresponds to the size of the problem. A higher strength challenge-response is one that has a larger problem that requires a higher cost to solve. Conversely, a lower strength challenge-response is one that has a smaller problem, and is thus easier to solve. For example, a strength of 20 may require a computing device seeking authentication to perform close to a million operations (i.e., $2^{20}=1,048,576$ operations), whereas the system will only need 20 operations to verify whether the response is correct or not. Increasing the strength by one will double the number of operations required of the computing device, but only increase the verification process by one operation.

An adjustability factor may be used by the system may change the strength of the challenge-response in accordance to the determined reputation. That is, if the computing device has a good reputation based on the identity profile, the system may present a lower strength challenge-response (i.e., a smaller NP-complete problem) that requires less time to solve because the computing device is identified as being lower risk. Conversely, if the computing device has a bad reputation based on the identity profile (i.e., higher risk), then a higher strength challenge-response (i.e., a larger NP-complete problem) may be presented. This logic suggests that computing devices identified as having questionable reputation have a higher likelihood of performing an attack. Accordingly, to discourage attacks such as credential stuffing from occurring on the application, the system increases the computational cost of logging on. Thus, hackers attempting to stuff the credentials to determine if any of the credentials work are met with challenges that are computationally expensive.

While the risk of a legitimate user being presented with a larger NP-complete problem is not insignificant, the additional cost to the user in this situation will be mostly imperceptible because the user will provide a proper username and password pair, typically on a first login attempt. Credential stuffers, on the other hand, will be challenged with an NP-complete problem each time a credential is entered. Thus, if the credential stuffer is attempting to try 10,000 username-password pairs on an application, and each NP-complete problem requires an average of two seconds of computational cost, then the attempt would require roughly 2 hours and 45 minutes in order to try all the username-password pairs. A two second computational cost for a legitimate user, however, would hardly be noticeable and create minimal friction in the user experience.

Once a strength of the challenge-response is set, the challenge-response is sent back to the computing device in operation 340. The system then waits for a response to the challenge from the computing device. Once a response is received, the system determines whether the response is valid. As discussed, validating the response is a much less costly operation than determining a valid response. As such, the system may determine whether the response is valid in an expeditious manner so as not to cause a prolonged delay. Once the challenge-response has been validated, the login attempt is permitted to proceed in operation 350, assuming that the credentials provided are valid. If the credentials are not valid, the login attempt is rejected.

In some instances, entering invalid credentials will be recorded in the identity profile, which will in turn cause a negative effect to the reputation score of the identity profile. The negative effect may grow for each wrongly entered set of credentials. That is, the first time a wrong username and password is entered, a minimal negative effect may result, but repeated entries of incorrect credentials will cause each instance of the negative effect to increase (e.g., repeated invalid tries may suggest that a bad actor is credential stuffing).

In some embodiments, the computing device may be provided with a predetermined amount of time to respond to the challenge. If the computing device does not respond within the time provided, the results will also be recorded in the identity profile, and thereby cause a detriment to the reputation score. By limiting the amount of time the computing device has to respond, the server may close out operations when the computing device is determined to be non-responsive, and thus conserve resources.

Additionally, providing a wrong answer to the challenge-response problem will also negatively affect the reputation score. A wrong response will also be recorded in the identity profile. In a preferred embodiment, a wrong response is viewed more negatively than no response at all, and thus will more severely harm to the reputation score as compared to non-responsiveness.

In some embodiments, the system may determine the computing capabilities of the computing device and adjust the strength of the challenge-response accordingly. For example, if the CPU of the computing device is detected to run at a slower speed (e.g., a mobile device may not have as much processing power as a desktop computer), the system may lower the strength of the challenge-response so that, in the even a legitimate user is attempting to log in, the computing device is not overwhelmed with its attempt to respond to the challenge. Likewise, if the computing device is detected to run at faster speeds, the challenge-response may be raised to a higher strength with a larger problem so as to not make a correct response too easily determinable. In some instances, the system is provided with a predetermined target response time (e.g., three seconds). The system may adjust the strength of the challenge-response based on the detected computing power to hit the target response time. In other words, the system may attempt to make the expected time it takes to respond to a challenge universal across all platforms the same, and adjusts the strength of the challenge-response to match the computing power of the computing device.

In some embodiments, a computing device may not have an identity profile because the computing device is being used to for a first time. In these instances, the computing device may be put on probation initially, and the challenge is applied indiscriminately. That is, a standard challenge is presented to the computing device until enough data has been collected to build the identity profile and thereby cause an adjustment in the reputation of that computing device. Issuing a default challenge when no information about a computing device is known may neutralize attempts by bad actors to circumvent the challenge by claiming the request is coming from a new device with each login try.

In some embodiments, when a computing device is determined to be a bad actor (e.g., known to have been previously used for credential stuffing), the system may present a challenge-response at a strength that takes and inordinate amount of time to solve. A blacklist of computing device identifiers or IP address may be used to facilitate this determination of bad actors. Additionally, the system may detect the environment from which the application requests is coming. For example, an application determined to be operating in a debugger environment on the computing device may cause a red flag to be raised, suggesting the computing device is a bad actor. As such, the computing device will be presented with a high strength challenge-response. The system may further maintain a library of tamper detectors that is continuously updated with known tamper techniques and protocols for detecting those techniques.

In some embodiments, the task being requested may be considered in determining the strength of the challenge-response presented to the computing device. For example, attempted logins to a financial institution is clearly an activity that requires the highest security. Thus, a higher strength of the challenge-response will be utilized. On the other hand, if an attempted authentication is for an application that does not store or use any sensitive information, then a lower strength of the challenge-response is used. The use of the challenge-response is directed at increasing the computational cost for potential credential stuffing hackers. Accordingly, applications that are known targets for such infiltration tactics may adopt a higher strength challenge-response from the outset and only adjust downward when a computing device has proven to be reputably safe.

Figure 4:
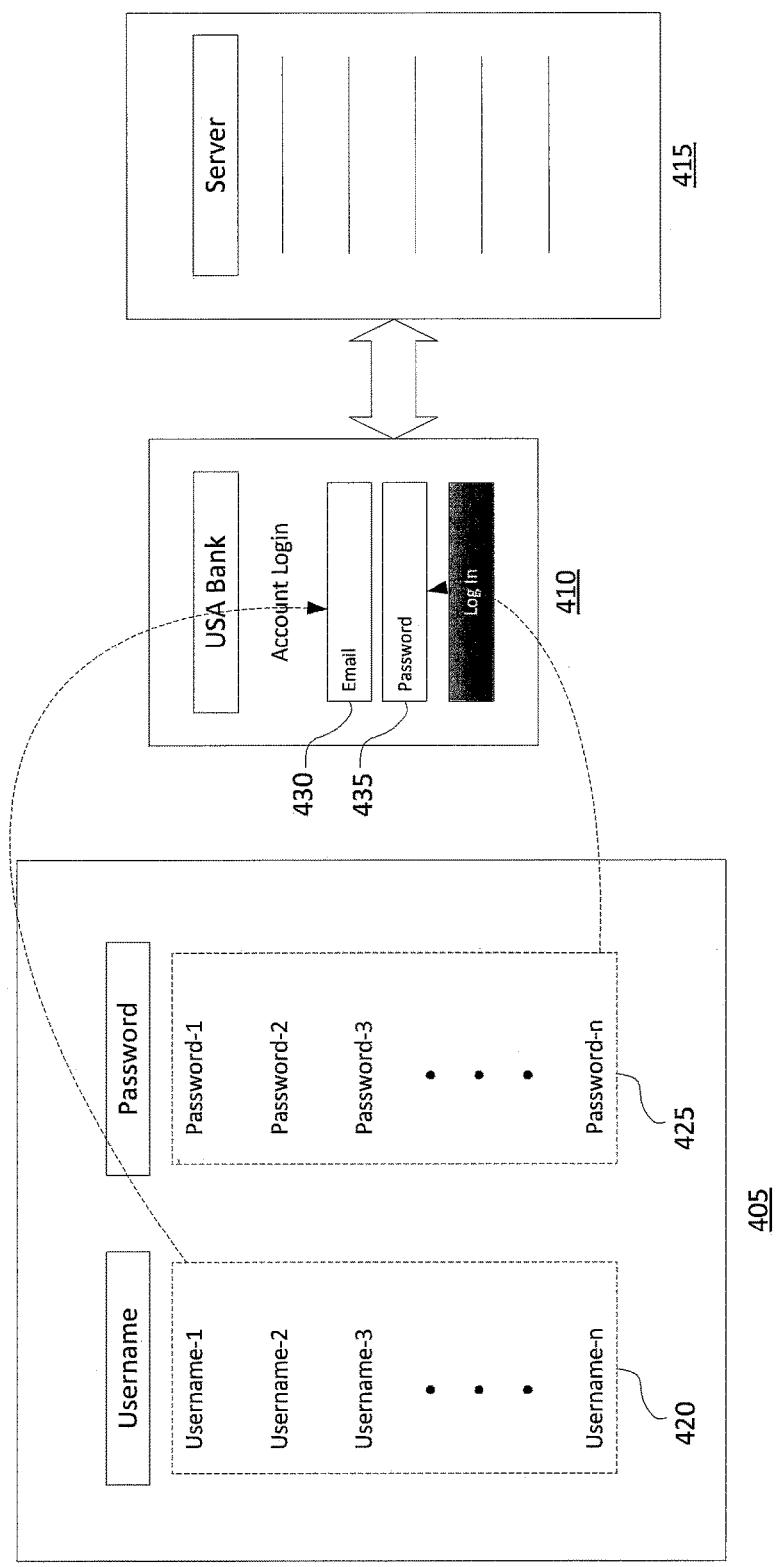
FIG. 4 provides an illustrative depiction of a credential stuffing attempt on a computing device within a network of computing devices.

FIG. 4 provides an illustrative depiction of a credential stuffing attempt on a computing device within a network of computing devices. A list of compromised credentials 405 is used to attempt logins on an application 410 running on a computing device. The application is communicatively coupled to an application server 415 via a network connecting the computing device to the application server 415.

In this example, the username 420 and password 425 pairs are individually tried in the username entry box 430 and password entry box 435 on the application 410. When the application 410 attempts a login on the application server 415, however, a challenge-response problem is presented by the application server 415 back to the application 410 for the computing device to complete before the login is permitted. Thus, for each username 420 and password 425 pair that is tried, there's an associated computational cost to the attempted login because of the challenge-response problem. As the number of username 420 and password 425 pairs grows, so does the cumulative cost of the challenge-response. For example, if there are 100,000 username 420 and password 425 pairs (i.e., n=100,000), the cost to the computing device to try every pair would be 100,000 multiplied by the computational cost required by the challenge-response problem.

Additionally, as discussed above, the strength of the challenge-response problem can be adjusted to accommodate a detected situation. If, for example, multiple attempts are received from a particular computing device or from a single IP address, the application server may, upon detecting such a behavior, increase the strength of the challenge-response problem to make it increasingly more costly for the computing device to process each additional attempt. Using and NP-complete problem, there is no limit as to how high the strength of the problem can be raised. Ostensibly, the server can send the computing device (or whatever device is attempting the logins) on a "wild goose chase" when a bad actor is discovered. Thus, rather than flat out denying access to the bad actor, the server may attempt to occupy the resources of the computing device used by the bad actor by issuing a challenge that requires a large amount of computational resources, and repeatedly issuing such a challenge even if the bad actor has responded correctly.

Since hackers using techniques like credential stuffing rely on the ability to try a large number of credentials in a short period of time, slowing down the process of entering credentials with a challenge-response problem will create a bottleneck in the hacking process that may lead the hackers to ultimately abandon their attempts. If, hypothetically speaking, one out of 10,000 credentials tried is successful, then an average of 10,000 login attempts would be needed to infiltrate one account. Thus, by challenging the process in a manner where trying a large amount of credentials on an application would take an inordinate amount of time, hackers will be discouraged from trying to compromise the application.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for authenticating a user, comprising:
   a non-transitory memory storing instructions; and
   one or more hardware processors coupled to the non-transitory memory and configured to execute the instructions to cause the system to perform operations comprising:
   receiving, from a computing device, a first login request for logging into an account;
   retrieving an identity profile associated with the computing device;
   determining a first reputation score for the first login request based on the identity profile;
   determining a first number of terms for a first challenge-response problem based on the first reputation score, wherein the first challenge-response problem comprises a first NP-complete problem;
   configuring the first challenge-response problem to use the first number of terms determined based on the first reputation score;
   sending the first challenge-response problem to the computing device;
   denying the first login request based on at least one of a first login credential or a first solution to the first challenge-response problem received from the computing device;
   subsequent to denying the first login request, receiving, from the computing device, a second login request for logging in to the account;
   determining a second reputation score for the second login request based on the first reputation score and a determination that the first login request has been denied;
   determining a second number of terms for a second challenge-response problem based on the second reputation score, wherein the second challenge-response problem comprises a second NP-complete problem;
   configuring the second challenge-response problem to use the second number of terms determined based on the second reputation score;
   sending the second challenge-response problem to the computing device; and
   authorizing the second login request in response to verifying a second login credential and a second solution to the second challenge-response problem received from the computing device.

2. The system of claim 1, wherein every additional number of terms in each of the first and second challenge-response problems causes (i) a first increase in computing power required to produce a response for the challenge-response problem and (ii) a second increase in computing power required to verify the response, wherein the second increase is less than the first increase.

3. The system of claim 1, wherein at least one of the first challenge-response problem or the second challenge-response problem is a subset-sum problem.

4. The system of claim 1, wherein the identity profile includes data representing past login attempts made through the computing device.

5. The system of claim 1, wherein the identity profile includes an internet protocol (IP) address associated with the computing device and types of transactions conducted by the computing device.

6. The system of claim 1, wherein the first number of terms for the first challenge-response problem is determined to be lower based on a higher reputation score or the first number of terms for the first challenge-response problem is determined to be higher based on a lower reputation score.

7. The system of claim 1, wherein the operations further comprise:
   determining a computing power of the computing device, wherein the first number of terms for the first challenge-response problem is determined further based on the determined computing power.

8. The system of claim 1, wherein the operations further comprise:
   determining a type of application that generated the first login request, wherein the first number of terms for the first challenge-response problem is determined further based on the determined type of application.

9. A method comprising:
   detecting a first login attempt for logging into a user account made through a computing device;

determining a first reputation score for the computing device based on attributes associated with the computing device;

determining a first number of terms for a first challenge-response problem based on the first reputation score, wherein every additional number of terms in the challenge-response problem causes (i) a non-linear increase in computing power required to produce a response for the challenge-response problem and (ii) a linear increase in computing power required to verify the response;

configuring the first challenge-response problem to use the first number of terms determined based on the first reputation score;

denying the first login attempt from proceeding in response to receiving a wrong solution to the first challenge-response problem or determining that a response was not provided within a predetermined period of time;

subsequent to denying the first login attempt, detecting a second login attempt for logging in to the user account made through the computing device;

determining a second reputation score for the second login attempt based on the first reputation score and a determination that the first login attempt has been denied;

determining a second number of terms for a second challenge-response problem based on the second reputation score;

configuring the second challenge-response problem to use the second number of terms determined based on the second reputation score;

sending the second challenge-response problem to the computing device; and processing the second login attempt in response to verifying a solution to the second challenge-response problem received from the computing device.

10. The method of claim 9, wherein each of the first and second challenge-response problems is an NP-complete problem.

11. The method of claim 10, wherein the NP-complete problem is a subset-sum problem.

12. The method of claim 9, wherein the attributes include a number of past login attempts made through the computing device within a predetermined period of time.

13. The method of claim 9, wherein the attributes include an IP address associated with the computing device and types of transactions conducted by the computing device.

14. The method of claim 9, further comprising:
in response to denying the first login attempt, updating an identity profile associated with the computing device to increase a count of failed login attempts.

15. The method of claim 9, wherein the second login attempt is processed further based on verifying a login credential received from the computing device.

16. The method of claim 9, further comprising:
determining a computing power of the computing device, wherein the first number of terms for the first challenge-response problem is determined further based on the determined computing power.

17. The method of claim 9, further comprising:
determining a type of application from which the first login attempt is received,
wherein the first number of terms for the first challenge-response problem is determined further based on the determined type of application.

18. A non-transitory machine-readable medium having stored thereon machine-readable instructions executable to cause a machine to perform operations comprising:
detecting a first login attempt for logging into an account made through a computing device having an associated identity profile;
determining a first reputation score based on the associated identity profile;
determining a first number of terms for a first NP-complete problem based on the first reputation score;
configuring the first NP-complete problem to use the first number of terms determined based on the first reputation score;
sending the first NP-complete problem to the computing device;
denying the first login attempt from proceeding based on at least one of a first login credential or a first solution to the first challenge-response problem received from the computing device;
subsequent to denying the first login attempt, detecting a second login attempt for logging into the account made through the computing device;
determining a second reputation score for the second login attempt based on the first reputation score and a determination that the first login attempt has been denied;
determining a second number of terms for a second NP-complete problem based on the second reputation score;
configuring the second NP-complete problem to use the second number of terms determined based on the second reputation score;
sending the second NP-complete problem to the computing device; and
authorizing the second login attempt in response to verifying a second solution to the second NP-complete problem received from the computing device.

19. The non-transitory machine-readable medium of claim 18, wherein the first number of terms for the first NP-complete problem is determined to be lower based on a higher reputation score or the first number of terms for the first NP-complete problem is determined to be higher based on a lower reputation score.

20. The non-transitory machine-readable medium of claim 18, wherein the operations further comprise:
determining a computing power of the computing device, wherein the first number of terms for the first NP-complete problem is determined further based on the determined computing power.

* * * * *